Patented May 1, 1951

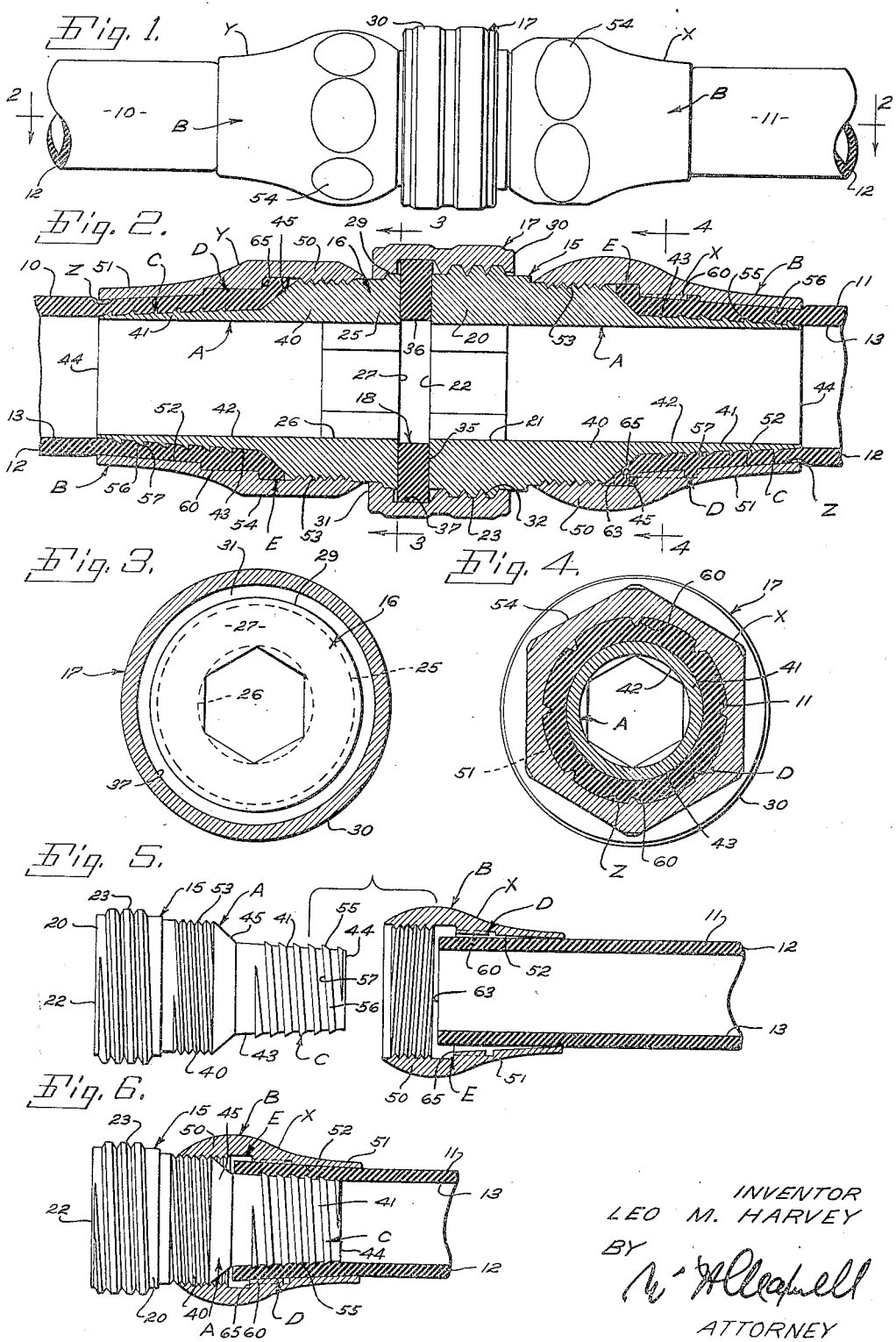

2,551,536

UNITED STATES PATENT OFFICE 2,551,536

HOSE CONNECTOR

Leo M. Harvey, Los Angeles, Calif.

Application February 7, 1948, Serial No. 6,840

7 Claims. (Cl. 285—84)

The present invention relates generally to a hose connector and more particularly to a construction for applying a connector fitting to the end of a hose.

It is common practice to apply connectors or fitting to the ends of fluid conduits such as rubber or plastic hoses and the like. Such fittings are not always satisfactory since they are more or less difficult to apply or install on a hose and very often damage or materially weaken the end portion of the hose. Further, such fittings are subject to failure under pressure, they frequently leak and under pressure they separate from the hose.

It is a general object of the present invention to provide a simple compact and practical connector for joining hose sections or the like.

It is another object of the present invention to provide an anchoring means for a connector of the character described that securely anchors a hose thereto.

It is another object of the present invention to provide a hose connector of the character described involving a sleeve that cooperates with an anchor part on the exterior of a tubular core or body to secure the hose to the connector.

It is a still further object of the present invention to provide a simple effective and dependable sealing means between the hose and the connector.

The various objects and features of my invention will be fully understood from the following detailed description of a typical preferred form and application of my invention, throughout which description reference is made to the accompanying drawings, in which:

Fig. 1 is a side elevation of a connector embodying the present invention. Fig. 2 is an enlarged longitudinal sectional view taken as indicated by line 2—2 on Fig. 1. Fig. 3 is a transverse sectional view taken as indicated by line 3—3 on Fig. 2. Fig. 4 is a transverse sectional view taken as indicated by line 4—4 on Fig. 2. Figs. 5 and 6 are views illustrating the manner in which a hose is coupled to the connector, Fig. 5 showing the parts disconnected or separated with the hose positioned ready for application of the connector and Fig. 6 showing the parts partially assembled or connected.

The connector of the present invention is applicable generally to conduits such, for instance, as garden hose or the like. The hose handled by the structure of the present invention may be made of any suitable material. In practice the materials most commonly employed in the manufacture of hose are rubber or plastic materials. The hoses to be joined may be alike or equal in size and may be of the same cross-sectional configuration. Each hose 10 and 11 shown in the drawings is a tubular element having a cylindrical wall 12 forming a passage 13 therethrough to carry fluid, or the like.

The connector of the present invention involves, generally, a threaded element 15 carried by and joined to the hose 11 by a coupler X, a flange element 16 carried by and joined to the hose 10 by a coupler Y, means 17 connecting the elements 15 and 16 and means 18 sealing the joint between the two elements 15 and 16.

The threaded element 15 is a tubular part characterized by a cylindrical body 20 having a central longitudinal passage 21 therethrough. The inner end of the body has a flat face 22 normal to the longitudinal axis of the body to be engaged by the seal 18. The body is provided on its exterior with threads 23 to be engaged by the means 17. In practice it is preferred that a portion, at least, of the passage 21 be made polygonal or key shaped in cross section to be engaged by a tool, such as a wrench, or the like. This facilitates rotating the body in the course of coupling element 15 to the hose 10 as will be hereinafter described.

The flange element 16 is a tubular part characterized by a cylindrical body 25 having a central longitudinal passage 26 therethrough. The inner end of the body has a flat face 27 normal to the longitudinal axis of the body to be engaged by the means 18. The body 25 is provided at its inner end with a radially projecting flange 29 to be engaged by the means 17. In practice it is preferred to make a part, at least, of the opening 26 polygonal or key shaped in cross section to be engaged by a tool such as a wrench, or the like, to facilitate rotation of the body 25 when coupling the element to the hose as will be hereinafter described.

The means 17 connecting the elements 15 and 16 may be in the nature of a collar 30 to be engaged over the inner ends of the elements 15 and 16. The collar 30 has an inwardly projecting radial end flange 31 slidable over the body 25 and such as to engage the flange 29 of the body 25. The collar 30 is provided with internal screw threads 32 that cooperate with the threads 23 on the body 20 of element 15. It will be apparent how the collar 30 may be engaged over element 16 so that the flange 31 will cooperate with flange 29 when the collar is screw threaded onto the element 15 to urge the inner end faces of the elements 15 and 16 toward each other.

The means 18 sealing between the elements 15 and 16 may be a simple annular packing ring or washer 35 of suitable material such a rubber, or the like, placed between the end faces 22 and 27. The ring has a passage 36 therethrough registering with the passages 21 and 26 of the elements 15 and 16. When the elements are urged toward each other by the means 17 the packing ring is compressed between the faces 22 and 27.

The collar may be provided at its interior with a circular annular recess 37 to retain the ring 35 in place in the collar when the parts are disconnected.

The coupler X joins or couples the element 15 to the hose 11 while coupler Y joins element 16 to hose 10. The couplers X and Y are preferably like structures and each involves generally, a body A projecting into the hose, a sleeve B engaged over the hose and secured to the body anchor means C fastening the hose to the body, lock means D between the hose and the sleeve, and a seal between the hose and the body.

The body of coupler X is preferably an integral continuation of the body 20 of element 15 while the body of coupler Y is an integral continuation of the body 25 of element 16. Each body is an elongate cylindrical part having a central longitudinal passage 42 therethrough and having an externally threaded inner portion 40 and a reduced outer portion 41 projecting into the hose. In practice the passage 13 of the hose, passages 21 and 26 of the elements 15 and 16 and the passages 42 of the couplers X and Y are in full communication and may be of substantially the same diameter. The outer wall 43 of the portion 41 is preferably tapered so that it converges from the inner end portion of the body to the outer end 44 of the body. The body portion 40 is considerably larger in diameter than the portion 41 and an outwardly facing inclined shoulder or face 45 occurs where the body portions 40 and 41 adjoin.

The sleeve B of each coupler is engaged over the hose and is secured to the body A. Sleeve B has an inner portion 50 adjacent to and overlying the inner portion 40 of the body A to be secured thereto, and has an outer portion 51 of reduced diameter adjacent to and overlying the outer portion 41 of the body to be spaced therefrom leaving or defining an annular opening Z to receive the hose. The opening Z corresponds substantially to the cross-sectional configuration of the hose, but is somewhat smaller in cross-sectional configuration than the house.

The inner portion 50 of the sleeve is preferably screw-threaded onto the body A as by threads 53 and the exterior of the sleeve B is preferably made polygonal at 54 so it can be conveniently engaged by a wrench, or the like. The inside wall 52 of the outer portion 51 of the sleeve is preferably tapered from the point where it joins portion 50 to the outer end of the sleeve. The taper of wall 52 may correspond to the taper of the exterior of body portion 41. In practice the sleeve preferably corresponds in length with the body, the inner and outer ends of the sleeve being substantially opposite to the inner and outer ends of the body.

The anchor means C of each coupler serves to fasten or anchor the hose to the body A. As illustrated in the drawings the anchor means C of the present invention is in the nature of a spiral or helical rib 55 formed on and projecting from the outer surface 43 of portion 41 of the body A. The rib 55 is preferably formed with an inclined outer side face 56 and with an inner side face 57 substantially normal to the longitudinal axis of the body. The faces 56 and 57 converge so that the rib is in the nature of a single continuous helical hook-like projection. Through the helical rib 55 the body may be advanced onto the end of the hose by rotation of the body relative to the hose. The lead of rib 55 is preferably the same as the lead of the thread 53. As shown in the drawings the threads 53 may be small and of double pitch while the rib may be large or coarse and of single pitch, yet both have the same lead. By providing threads 53 and rib 55 of the same lead both the sleeve and the hose will advance onto the body at the same rate.

The lock means D of each coupler prevents relative rotation between the sleeve B and the hose. As shown in the drawings the means D may be in the nature of longitudinal teeth or projections 60 formed in or on the wall 52 of the sleeve. The teeth are preferably narrow V-shaped projections and are confined to the inner end portion of the wall 52 adjacent the portion 50 of the sleeve. It will be readily seen that the end of the hose carried in the opening Z will be engaged by the teeth 60 and thereby prevented from rotating relative to the sleeve.

The seal E of each coupler is provided between the hose and body to insure a tight fluid connection between these parts. The seal E is established by forcing the end 63 of the hose into pressure engagement with the conical or inclined face 45. In practice the inner diameter of the portion 50 of the sleeve may be counterbored or somewhat larger in diameter than the outer portion 51 of the sleeve so that a shoulder 65 is formed where the portions 50 and 51 adjoin. The shoulder 65 is outward of the face 45 and opposes the face leaving an annular chamber to receive the tip end of the bore. By forcing the hose against the face 45 it is spread radially outwardly and is tightly wedged between the face 45 and the sleeve. The spread part of the hose forms an enlarged head on the end of the hose filling the chamber between the face 45 and shoulder 65. This structure supplements the means C in anchoring the hose to the coupler.

To assemble the connector of the present invention the end of the hose is introduced into the portion 51 of the sleeve from its outer end to project somewhat into the portion 50 as shown in Fig. 5 of the drawings. The body A of the coupler is then advanced into the sleeve B by rotating the parts relative to each other so that the helical rib 55 advances into the hose while the body portion 40 threads into the portion 50 of the sleeve. The hose conforms to the configuration of the rib 55 and the teeth 60 engage the exterior of the hose preventing rotation of the hose in the sleeve. The taper of the portions 41 and 51 of the body and sleeve, respectively, and the head formed at the inner end of the hose prevent separation of the hose from the connector.

It is important to note that the anchor means involves a rib or projection on the exterior of the element that enters the hose. Force or strain tending to pull the hose from the coupler tends to contract the hose with consequent increase of gripping pressure of the hose on the anchor means.

From the foregoing description it will be apparent that the connector provided by the present invention is formed of simple and easily constructed parts that are inexpensive of manufacture, and that the structure can be easily and quickly assembled to form a practical sturdy leakproof connection that is neat and safe to operate.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A hose coupler including, an elongate tubular body having an inner end portion and a reduced outer end portion to be inserted into the end of the hose, there being a beveled shoulder between the said portions of the body facing the outer end portion of the body, a sleeve with an opening therethrough having an inner portion threaded to the inner portion of the body and an outer portion engageable over the end of the hose, there being a counterbore in the sleeve opening in register with the shoulder when the sleeve is on the body, the end portion of the hose being wedged outwardly by the shoulder to enter and seal in the counterbore and a hose anchor comprising a helical rib on the exterior of the outer end portion of the body.

2. A hose coupler including, an elongate tubular body having an inner portion and a reduced outer portion to be inserted into the end of a hose, a sleeve having an inner portion and an outer portion engageable over the end of the hose, a threaded connection between the inner portions of the body and sleeve, and a hose anchor comprising a helical rib on the exterior of the body having the same lead as the threaded connection the interior of the outer end portion of the sleeve having a plurality of shoulders facing the inner end portion of the sleeve and holding the hose against axial displacement.

3. A hose coupler including, an elongate tubular body having an inner portion and a reduced outer portion to be inserted into the end of a hose, a sleeve having an inner portion and an outer portion engageable over the end of the hose and a counterbore between said portions, a double thread connection between the inner portions of the body and sleeve, a lock including an annular series of teeth in the sleeve at the outer portion of the sleeve adjacent the inner portion thereof engaging the hose and preventing rotation between the hose and sleeve, a seal between the hose and body including a conical face extending between the said portions of the body engaging the end face of the hose and wedging the end portion of the hose into said counterbore, and an anchor including a single continuous helical hook-shaped rib on the exterior of the body and engaging in the hose fastening the hose to the body against axial displacement therefrom, said threaded connection having the same lead as the lead of said helical anchor.

4. A connector of the character described including two flat ended tubular elements, one of the elements being a flanged element and the other being a threaded element, joined together at their inner ends by a collar joining said elements, the collar having a flange engaging the flanged element and threads engaging the threaded element, a seal engaged between the flat ends of the elements, and a hose coupler on each of said elements, each coupler including an elongate tubular body having an inner portion and a reduced outer portion to be inserted into the end of a hose, a double thread on the exterior of the inner portion of the body, a sleeve having an inner portion and an outer portion engageable over the end of the hose, there being a counterbore in the sleeve intermediate its ends, a double thread in the inner portion of the sleeve cooperating with the first mentioned thread to connect the body and sleeve, lock teeth on the interior of the outer portion of the sleeve adjacent the inner portion thereof engaging the hose and preventing rotation between the hose and sleeve, a seal between the hose and body including a conical face on the exterior of the body in register with the counterbore in the sleeve extending between the said inner and outer portions of the body and engaging the end face of the hose and wedging the end portion of the hose between the body and sleeve and into the counterbore, and an anchor including a single continuous helical hook-shaped rib on exterior of the outer portion of the body holding the hose to the body against axial displacement therefrom, said rib having the same lead as the said double threads.

5. A hose coupler including, an elongate tubular body having an inner portion and a reduced tapered outer portion to be inserted into the end of a hose, a double thread on the exterior of the inner end portion of the body, a sleeve having an inner portion and an internally tapered outer portion engageable over the hose engaged on the body, a double thread in the inner portion of the sleeve and cooperatively engaged with the first mentioned thread, and a hose anchor including a single helical rib on the exterior of said outer end portion of the body having the same lead as the said threads.

6. A hose coupler including, an elongate tububar body having an inner portion and a reduced tapered outer portion to be inserted into the end of a hose, a double thread on the exterior of the inner end portion of the body, a sleeve having an inner portion and an internally tapered outer portion engageable over the hose engaged on the body, a double thread in the inner portion of the sleeve and cooperatively engaged with the first mentioned thread, longitudinally disposed lock parts on the interior of the outer end portion of the sleeve engaging the exterior of the hose and preventing relative rotation between the sleeve and hose and a hose anchor including a single helical rib on the exterior of said outer end portion of the body having the same lead as the said threads.

7. A hose coupler including, an elongate tubular body having an inner portion and a reduced tapered outer portion to be inserted into the end of a hose, a double thread on the exterior of the inner end portion of the body, a sleeve having an inner portion and an internally tapered outer portion engageable over the hose engaged on the body, a double thread in the inner portion of the sleeve and cooperatively engaged with the first mentioned thread, lock parts on the interior of the outer end portion of the sleeve engaging the hose and preventing relative rotation between the hose and sleeve, and a hose anchor including a single hook-shaped helical rib on the exterior of said outer end portion of the body having the same lead as the said threads, the anchor having a hose holding face facing toward the inner end of the body and holding the hose against axial displacement from the outer end of the body.

LEO M. HARVEY.

REFERENCES CITED

The following references are of record in the file of this patent:

UNITED STATES PATENTS

| Number | Name | Date |
| --- | --- | --- |
| 16,450 | Phillips | Jan. 20, 1857 |
| 512,252 | Kempshall | Jan. 2, 1894 |
| 872,001 | Massie | Nov. 26, 1907 |